(No Model.)
J. A. REW.
PLOW ATTACHMENT.
No. 359,632.   Patented Mar. 22, 1887.
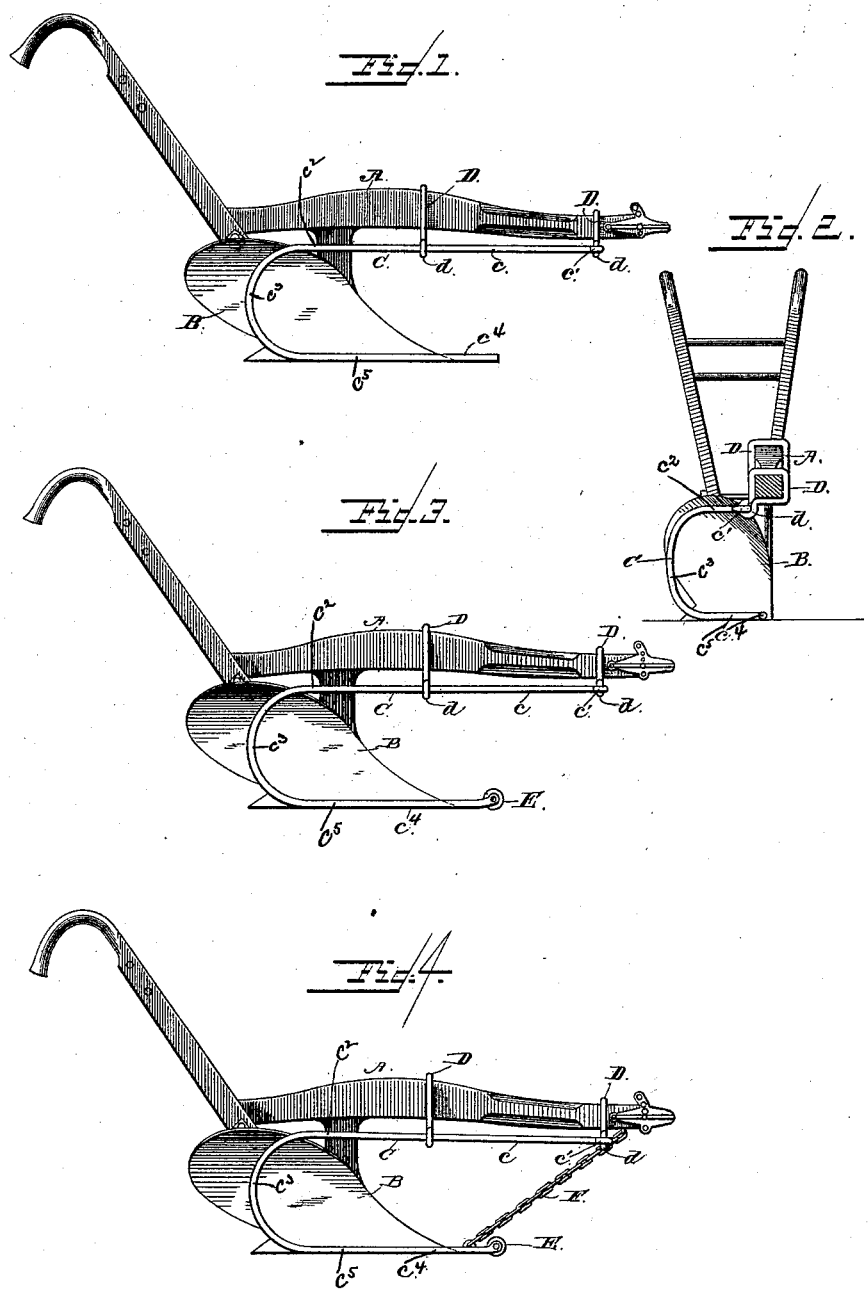

UNITED STATES PATENT OFFICE.

JUSTUS A. REW, OF PRATT TOWNSHIP, PRATT COUNTY, KANSAS, ASSIGNOR OF ONE-FOURTH TO H. L. REW, OF FRIENDSHIP, NEW YORK.

PLOW ATTACHMENT.

SPECIFICATION forming part of Letters Patent No. 359,632, dated March 22, 1887.

Application filed December 18, 1886. Serial No. 221,984. (No model.)

*To all whom it may concern:*

Be it known that I, JUSTUS A. REW, a citizen of the United States, residing at Pratt township, in the county of Pratt and State of Kansas, have invented a new and useful Improvement in Plow Attachments, of which the following is a specification.

My invention relates to improvements in plow attachments, and aims to provide a device which will serve to straighten the grass and stubble on a field being plowed and remove said grass and stubble from the furrow. This object I secure by means of the device illustrated in the accompanying drawings; and my invention consists in certain novel features thereof, as will be hereinafter more fully described and claimed.

In the said drawings, Figure 1 is a side elevation of a plow provided with my improvements, and Fig. 2 is a front elevation of the same. Figs. 3 and 4 are side elevations showing slight improvements.

Referring to the drawings by letter, A indicates the beam, and B the share, of an ordinary breaking-plow.

C represents my improved attachment or stubble-turner, which is constructed and secured to the beam in the manner now about to be described.

The beam is provided with one or more loops or hangers, D, which encircle the beam, and are provided at their lower corners with small loops or hooks $d$, by which the attachment C is held in position. These hooks or loops $d$ are arranged on the mold-board side of the beam, so that when the attachment is secured thereto it will fall about in the center of the furrow and its rear end will lie in front of the mold-board, thereby preventing the grass striking the mold-board and sticking thereto in large quantities, thereby estopping the successful and easy operation of the plow. In the drawings I have shown two of these hangers D; but in practice one will be generally found sufficient. This one I attach to the beam near the forward end thereof.

The attachment or stubble-turner C consists of a stout spring rod or wire having a straight or nearly straight portion, $c$, which runs alongside the beam, and is provided at its forward end with a hook or loop, $c'$, which engages the loop or hook $d$ of the forward hanger, D. The rear end of the stubble-turner is turned outward, as at $c^2$, from the beam, then downward to the ground, as at $c^3$, then inward a short distance in a line parallel to the lower edge of the mold-board, as at $c^5$, and then forward in a straight line a suitable distance, as at $c^4$, to enable the point to properly separate the blades of grass and the stubble which may have formed in clumps or large quantities.

The rear end of the attachment is so curved when bending it into shape that it has approximately the outline of the mold-board, thus effectually turning the stubble and dirt from the mold-board. The lower forwardly-extending portion, $c^4$, as the plow is drawn along the field, runs along the surface of the ground in advance of the plowshare, as will be readily understood, and enters all clumps of grass and stubble, breaking up and dispersing the same, and as the plow advances the rear outwardly-turned portion, $c^2$, of the attachment will act upon the grass and throw or turn the same out of the line of the furrow and from in front of the plowshare. Thus, it will be seen, all obstructions are removed from the path of the mold-board, and all grass or lumps of dirt which would otherwise stick to and clog the mold-board are removed and a straight unbroken furrow may be quickly and easily plowed. Should an unusually large obstruction be met, the turner will readily pass the same, as, being made of stout spring-wire, it will yield slightly to the same, and at the same time will exert sufficient pressure thereon to loosen it and move it from its place as the plow advances.

By drawing the plow backward, the attachment will slip forward a distance sufficient to allow the plow to be readily turned to one side or the other, as the attachment, being preferably connected to the beam by a single hanger, D, will turn upon its connection as upon a pivot, thereby offering no obstacle to the turning of the plow.

It may sometimes be found desirable to attach a small wheel or roller, E, to the forward end of the lower portion, $c^4$, of the turner, and, also, sometimes to turn a chain, F, from the said forward end of the turner to the forward end of the plow-beam; and either or both of these devices may be used without departing from my invention.

In Figs. 3 and 4 I have shown these improvements, and I think they will be readily understood without being more particularly herein referred to.

Having thus fully described my invention, what I claim, and desire to secure by Letters Patent, is—

The combination, with a plow, of a stubble-turner held to the beam, the said stubble-turner consisting of a single continuous piece of spring rod or wire having its end secured to the forward end of the beam, then extending back alongside the beam to the plow-standard, whence it is bent outward, as at $c^2$, then downward to the ground, as at $c^3$, then inward toward the beam, as at $c^5$, and then forward in this plane parallel to the line of the furrow, as at $c^4$, the bent portion approximately the outline of the mold-board, substantially as set forth.

In testimony that I claim the foregoing as my own I have hereto affixed my signature in presence of two witnesses.

JUSTUS A. REW.

Witnesses:
 GEO. W. STEENROD,
 J. H. GAFF.